United States Patent
Niestemski et al.

(10) Patent No.: US 10,103,956 B2
(45) Date of Patent: Oct. 16, 2018

(54) VIRTUAL MACHINE PROCESSOR AND MEMORY RESOURCE COORDINATOR

(71) Applicant: Virtual Instruments Corporation, San Jose, CA (US)

(72) Inventors: Francis Niestemski, Mountain View, CA (US); Nicholas York, San Ramon, CA (US)

(73) Assignee: Virtual Instruments Corporation, San Jose, CA (US)

( * ) Notice: Subject to any disclaimer, the term of this patent is extended or adjusted under 35 U.S.C. 154(b) by 861 days.

(21) Appl. No.: 14/501,820

(22) Filed: Sep. 30, 2014

(65) Prior Publication Data

US 2016/0094424 A1    Mar. 31, 2016

(51) Int. Cl.
| | |
|---|---|
| *G06F 15/173* | (2006.01) |
| *H04L 12/26* | (2006.01) |
| *H04L 12/24* | (2006.01) |
| *G06Q 10/08* | (2012.01) |
| *G06F 9/455* | (2018.01) |

(52) U.S. Cl.
CPC ...... *H04L 43/0817* (2013.01); *H04L 41/0823* (2013.01); *G06F 9/45558* (2013.01); *G06Q 10/087* (2013.01); *H04L 41/0866* (2013.01)

(58) Field of Classification Search
CPC .................. G06F 9/45558; G06Q 10/087
See application file for complete search history.

(56) References Cited

U.S. PATENT DOCUMENTS

| | | | |
|---|---|---|---|
| 2008/0162308 A1* | 7/2008 | Sharma ............... | G06Q 10/087 705/28 |
| 2013/0297769 A1* | 11/2013 | Chang ................ | G06F 9/45558 709/224 |
| 2015/0355924 A1* | 12/2015 | Holla ................. | G06F 9/45558 718/1 |

* cited by examiner

*Primary Examiner* — Philip Chea
*Assistant Examiner* — Mohammed Ahmed
(74) *Attorney, Agent, or Firm* — Lowenstein Sandler LLP

(57) ABSTRACT

A network monitor is used to determine resource (e.g., CPU, memory, storage, or network) utilization of one or more virtual machines on one or more corresponding servers. Using resource utilization data for an original configuration of the virtual machines on the servers, the described system and methods simulate reconfigurations of various VMs on servers, determines resource utilization of the simulated reconfigurations, and proposes a reconfiguration that results in lower resource utilization across the one or more corresponding servers.

16 Claims, 6 Drawing Sheets

100

VIRTUAL MACHINE PROCESSOR AND MEMORY RESOURCE COORDINATOR

CROSS REFERENCE TO RELATED APPLICATIONS

Background

The present disclosure relates generally to virtualized computing environments. Specifically, the present disclosure relates to a virtual machine processor and memory resource coordinator.

A virtual machine (VM) is a software based emulation of a physical computer that, like a physical computer, executes programs (including applications and complete operating systems). One advantage of a virtual machine is that multiple different operating system environments can coexist on the same computer (i.e., a server) with isolation between them. This allows for the operation of many applications on a single physical server. This leads to greater server utilization which, in turn, leads to fewer servers in a network. In this way, using VMs can reduce the capital and operational costs of a network because fewer servers are used to complete the required computational tasks. Furthermore, because a VM is self-contained software, a VM requires significantly less maintenance than an analogous network with only physical servers.

However, there are some operational issues associated with VMs. VMs operate by dividing the hardware resources of a server between various virtual machines operating on the server based on the demand of the VMs. These resources include CPU usage, memory usage, and network usage. If resources are unavailable to allocate to the VM, then the VM must wait for the resources to become available. These resource constraints can compound between multiple VMs and their corresponding servers, which if left unaddressed, can cause significant wait times within the VM or the server.

One method of addressing hardware resource constraints on a server caused by predictable resource demands is by scheduling resource-intensive tasks so that they do not occur concurrently. Computational scheduling priorities can be assigned using any of a variety of metrics, including deadlines, estimated computation times, or computation credits. While some resource-intensive tasks can be readily scheduled (e.g., backups), others cannot (e.g., tasks initiated by clients).

Another method used to address resource constraints is to react to errors as they occur. However, during the correction period, unexecuted tasks accumulate thus compounding the performance problems of the VM.

Figure 1:
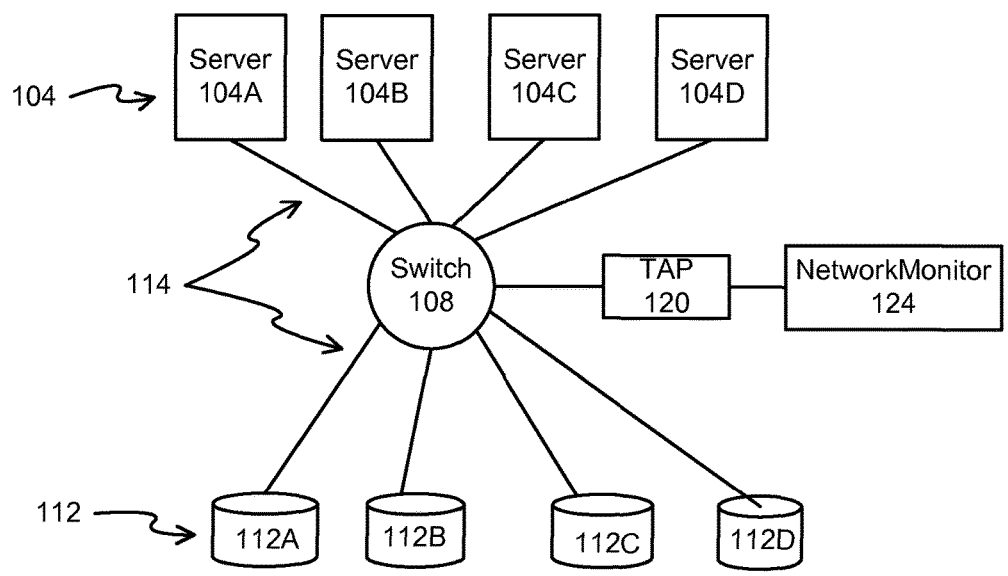
FIG. 1 is a schematic diagram of a network environment used for the operation of virtual machines, in an embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Overview

Embodiments of the present disclosure include a Virtual Machine (VM) system that discovers and monitors utilization of computing resources of a server that are used by a VM operating on the server. Resources utilized by a VM include central processing units (CPU), server memory, network performance metrics and storage disk input/output (I/O) performance metrics for each VM in a virtualized environment on a server for each unit of time within a time window. Rather than condensing the utilization per unit time within a time window into a simple average (or other similarly condensed indication of utilization), embodiments of the present disclosure retain the utilization per unit time within a time window and use this utilization pattern throughout the time window for analysis of the system. For example, using utilization per unit time within a time window to determine patterns of resource utilization, the systems and methods described herein analyze configurations of various VMs on their corresponding servers, model different configurations of the VMs on servers of a server cluster, and propose alternative configurations (i.e., assignments of the various VMs to servers of the cluster) to anticipate and prevent delays caused by resource constraints. The utilization patterns are analyzed so that resource utilization from different VMs "destructively interferes." That is, a trend of increasing utilization for one VM is matched by a trend of decreasing utilization for another VM. Once these trends are identified, the VMs can be reconfigured to a same server. In one embodiment, the VM probe facilitates the transition of a VM session from a first server to a second server seamlessly to decrease wait times and/or delays associated with execution of computing functions and tasks by a VM.

One benefit of embodiments of the present disclosure is more efficient use of computing resources for virtualized environments. For example, computer tasks can be monitored and reallocated among resources, thus delaying the purchase and physical addition of new servers, storage resources, and other network equipment. Another benefit of embodiments described herein is improvement in performance of a VM. Rather than, as is traditional, operating a VM until a resource constraint is detected and then waiting as the system resolves the error or using an average utilization value over a large time scale to recommend a reconfiguration, embodiments described herein anticipate and prevent such delays and resource constraints by analyzing utilization patterns per unit time throughout a time window of VMs and servers, thus detecting utilization issues not detectable using a simple statistical value (e.g., average utilization). This improves system performance and reduces system and/or computation delays.

System Architecture

FIG. 1 is a schematic example of a network environment 100 in which one or more VMs are operated on one or more servers. In this example, the network environment 100 includes a server cluster 104 of servers 104A-D, a switch 108, a storage array 112 of storage devices 112A-D, communication links 114, traffic access point ("TAP") 120 and a network monitor 124. The arrangement and number of the various network devices shown in the network environment 100 have been selected for convenience of explanation. Analogous network environments 100 can include any number of these devices, as well as other devices (e.g., authentication servers, failover devices, power systems) not shown.

The servers 104A-D of the server cluster 104 are used to execute, for example, computations, database queries, general instructions, or read and write instructions to and from the various storage devices 112 using CPUs, among other devices. The servers 104A-D are, in this example, used for the operation of one or more VMs, as will be shown schematically in FIGS. 2, 3A and 3B. Examples of servers used in typical embodiments of the network environment 100 include, but are not limited to ESX® servers by VMWARE® of Palo Alto, Calif., HYPER V® servers by MICROSOFT CORPORATION® of Redmond, Wash., and AIX® servers by INTERNATIONAL BUSINESS MACHINES CORPORATION® of Armonk, N.Y., and others.

Switch 108 of the network 100 connects one or more servers 104 with one or more storage devices 112 and permits flexibility and versatility in the network environment 100. Switches allow, for example, the balancing of processing loads, management of storage utilization, and the management of other aspects of network performance. Switches 108 also enable multiple devices to be in communication with each other without requiring a direct link between them.

Storage devices 112A-D in a storage array 112 include volatile and non-volatile memory systems used to store data transmitted through the network. Examples of storage devices 112A-D include RAID storage devices and others.

The network links 114 of the example network environment 100 include optical fibers for the transmission of data and instructions between the servers 104A-D and the storage devices 112A-D. In the example of the network environment 100, the network links 114 are cables of optical fibers. In other types of networks, the links 114 are Ethernet cables, electrically conductive connections, or other types of connections that place devices in communication with one another. As shown, the network links 114 can be used to connect devices to the switch 108, which facilitate creation of more flexible, and more complicated, network topologies.

The TAP 120 is a device placed in communication with the switch 108 or one of the links 114. The TAP 120 obtains a copy of communications occurring on a network link. In the case of the network environment 100, which uses optical links, the TAP 120 diverts a portion of the power of a data signal and sends it to a network monitor 124 while allowing the majority of the signal power to continue to its destination. One example of the TAP 120 is a fused biconical tapered ("FBT") optical signal splitter that is inserted in a link 114. Other types of networks (such as non-optical networks) use appropriate technologies for accessing or copying the transmitted signals.

The network monitor 124 receives and collects data from the TAP 120 that is indicative of the performance of the various network components and can be used to determine one or more metrics used to quantify the utilization and/or performance of the network components, the virtual machines individually, and/or a configuration of virtual machines on a plurality of servers. The network monitors themselves can be virtual (i.e., computer-executable code associated with one or more ports of a storage device and/or server) or physical probes that are physically connected to network elements (e.g., a server, a storage device, a switch, or a link connecting any of the foregoing). Regardless of the type, network monitors collect data that is then analyzed to determine various aspects of performance and network device utilization.

As described herein, the network monitors are used to monitor the utilization and performance of the servers (e.g., memory and CPU) and storage devices associated with one or more configurations of hosted VMs on a unit time basis within a time window. The collection and monitoring of this data occurs continuously in some embodiments. Analysis of the collected data can occur periodically, automatically, or upon instruction by a user. Utilization parameters of particular relevance to the embodiments described herein include CPU utilization (e.g., FLOPs per second) and memory utilization (e.g., bits per second) or alternatively, the proportion of the maximum utilization consumed by the system.

Virtual Machine/Server Architecture

In a server cluster, such as the server cluster 104 as shown in FIG. 1, in which multiple VMs operate on multiple servers, it can be difficult to cost-effectively configure the various VMs such that resource capacity is not exceeded (i.e., improving utilization rather than merely adding additional expensive server capacity that is also under-utilized most of the time). The following describes reconfiguring a plurality of VMs across a plurality of servers in a server cluster such that resource utilization is reduced.

Figure 2:
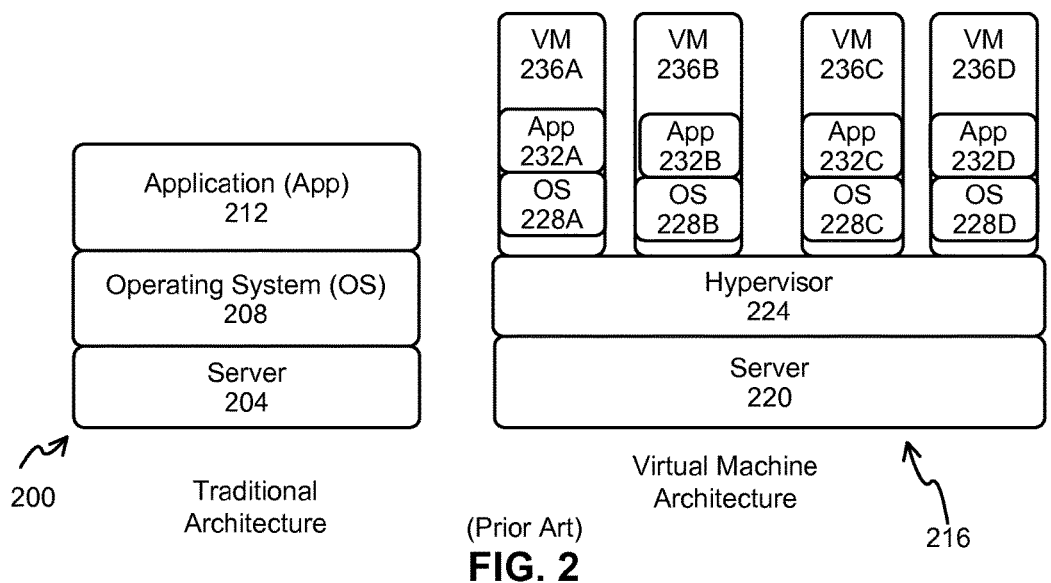
FIG. 2 is a schematic comparison between a traditional server/application architecture and a virtual architecture, both of which are in the prior art, in an embodiment.

FIG. 2 is a schematic comparison between traditional server/application architecture and VM architecture, in an embodiment. In the traditional server/application architecture 200, a single server 204 executes a single operating system 208 that, in turn, executes a single application 212. In this environment, expansion of the one operating system 208 or the one application 212 beyond the server 204 dedicated to their operation requires the addition of an additional server. For situations in which the increased use of an application is insufficient to fully utilize the additional server, expensive server capacity is wasted. Correspondingly, as utilization of the server 204 by the operation system and/or the application 212 approaches its full capacity, it is statistically more likely (according to the Erlang C equation) that the server will be at 100% utilization for periods of time, thus delaying the execution of some calculations and decreasing server performance (i.e., increasing wait times).

As also shown in FIG. 2, an improvement in the dedicated server model 200 is that of a virtual machine architecture 216. In the virtual machine architecture 216, a server 220 operates a hypervisor 224. The hypervisor 224 creates, monitors, and operates one or more VMs 236A-D on the server 220. Each VM 236A-D of which executes operating systems 228A-D, which in turn executes one or more corresponding applications 232A-D. The hypervisor 224 allocates server and network resources (e.g., CPU usage, memory usage, network transmission bandwidth) to the various VMs (represented in the figure by an operating system/application pair) according to resource capacity and the demands of the various VMs operating on the server 220.

Figure 3A:
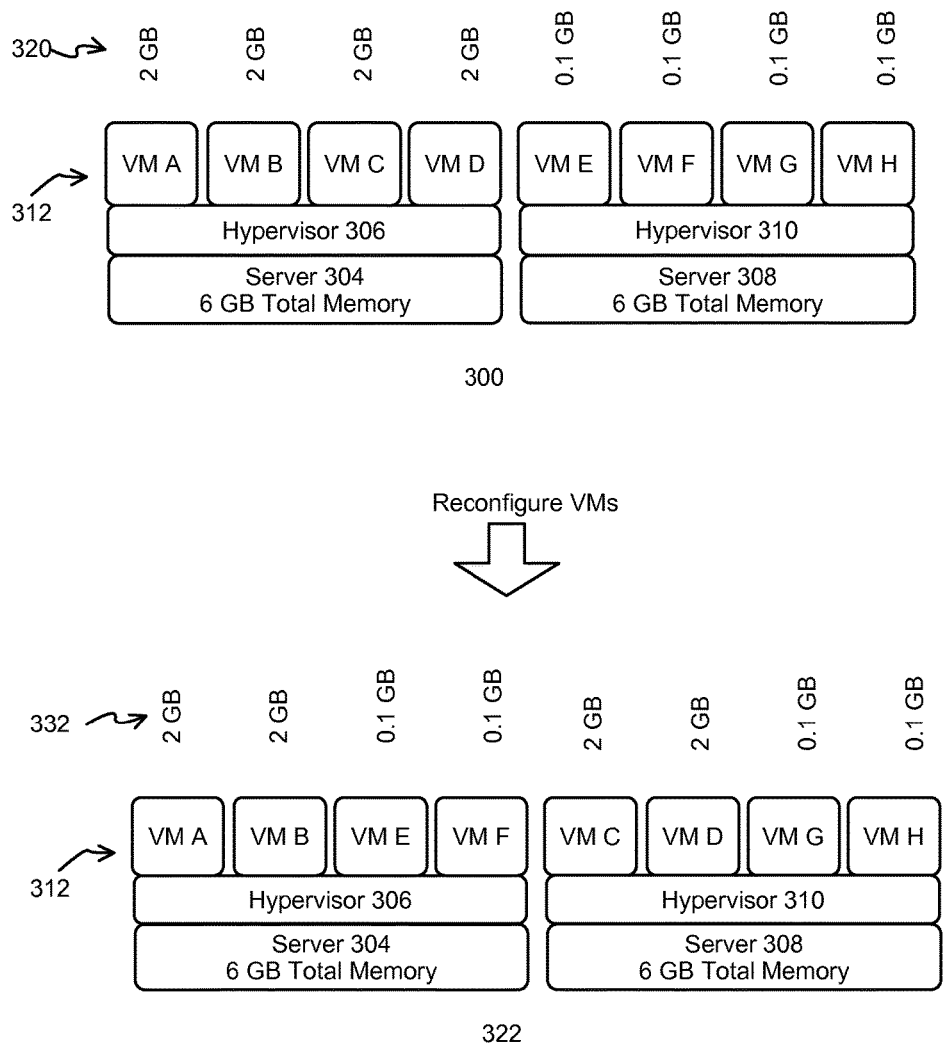
FIG. 3A is an illustration of an over-utilized server and an under-utilized server that are reconfigured according to the present disclosure, in an embodiment.
Figure 3B:
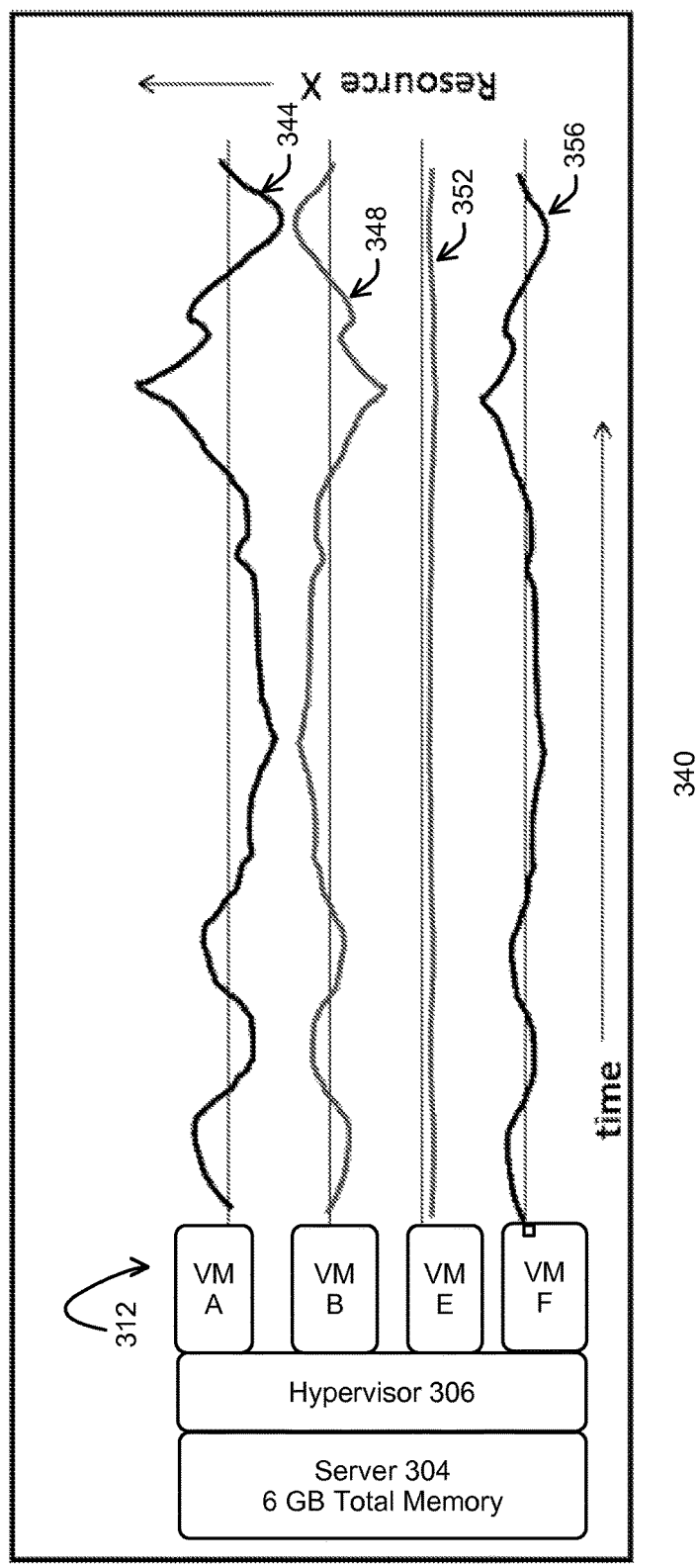
FIG. 3B is an illustration of resource utilization measured continuously per unit time within a time window, which is used to determine a reconfiguration of virtual machines on a server, in an embodiment.

FIGS. 3A and 3B schematically illustrate an application of methods and systems of the present disclosure used to reconfigure applications in a virtual environment on physical servers to prevent system delays. This reconfiguration is accomplished by re-assigning various applications from an over-utilized server to an under-utilized server. The reconfiguration of the VMs on the servers is based on a pattern of server utilization(s) by one or more VMs corresponding to their respective servers as a function of time, rather than, as is conventionally done, merely a one dimensional average or maximum utilization that does not consider resource utilization patterns in time. Before describing examples of the time patterns and their application, the reconfiguration itself will be described in FIG. 3A.

FIG. 3A displays an original virtual system environment 300 and a reconfigured virtual system environment 322. The original system virtual environment 300 includes servers 304 and 308, corresponding hypervisors 306 and 310, and VMs 312A-H (the corresponding operating systems and applications executed by the VMs are omitted for clarity). Mean memory utilizations 320 corresponding to each VM are also shown.

In the original system environment 300 of FIG. 3A, the server 304 includes 6 Gigabytes (GB) of total memory. Because each of the four VMs 312A-D utilize 2 GB of memory (on average), the server 304 is over utilized for a net utilization from the VMs corresponding to (or configured on) the server. That is, because the server 304 has only 6 GB of memory and because the VMs 312A-D requires a net utilization of 8 GB of memory in the time window, the server 304 is unable to execute all tasks requiring memory simultaneously and therefore will delay the execution of some tasks until sufficient memory is available.

The original system environment 300 also includes an under-utilized server 308. As shown, VMs 312E-H require an average of 0.4 GB of net memory utilization whereas the server 308 has 6 GB of total memory. Thus, 4.6 GB of memory of the server 308 is available for use.

VMs 312 of the original system environment 300 are reconfigured to system environment 322 so that the memory requirements are more appropriately balanced between the servers 304 and 308 throughout the time window. Analogous to the original system environment 300, reconfigured system environment 322 includes the servers 304 and 308, hypervisors 306 and 310, and VMs 312A-H. Memory utilizations 332 at one unit of time within the time window corresponding to each VMA-H 312 are also shown for illustration and convenience of explanation.

Upon reconfiguring the original system environment 300 to reconfigured system environment 322, the over-utilization within the time window of the server 304 is resolved. This reconfiguration is accomplished by moving VMs 312E and F from the server 308 to the server 304, and moving VMs 312C and D from the server 308 to the server 304. This reconfiguration shifts high utilization VMs (i.e., high utilization operating systems and applications executed by the VMs) from the over-utilized server 304 to the under-utilized server 308. Thus, the peak net memory utilization within the time window of both servers 304 and 308 is 4.2 GB.

The reconfiguration shown in FIG. 3A is not merely based on an average utilization value for a large time scale (e.g., one month). Such average utilization values can be used to reduce over-utilization or the frequency of over-utilization of a server, but use of such a number still can lead to frequent utilization conflicts. This is because an averaged utilization value masks any of a number of over-utilizations that have occurred over the averaged period. For example, an averaged utilization will hide the fact that the corresponding servers exceeded capacity by 5% once a week if the same servers were under-utilized by 10% at least once a week. Even though the average utilization is acceptable, server delays are still occurring during the over-utilization period.

To address this, embodiments of the present disclosure analyze utilization patterns of VMs on their corresponding servers over a plurality of time units as a function of time within a time window. Embodiments then seek to match the utilization per unit time throughout the time window so that the frequency and/or magnitude of over-utilization is decreased. This is illustrated in FIG. 3B as graph 340.

The graph 340 includes the utilization patterns as a function of time 344, 348, 352, and 356 for VMs 312A, B, E, and F, respectively. The VMs 312A, B, E, and F operate on the server 304 through hypervisor 306.

FIG. 3B shows that the reconfigured system environment 322 shown in FIG. 3A is not merely based on an average memory utilization at the server for the VMs, but rather is based on patterns of utilization of the VMs at a plurality of time units as a function of time within a time window. For example, each utilization at each time unit that is used to generate each utilization pattern 344, 348, 352, 356 includes utilizations measured on any one of a per millisecond, per second, per minute, or per hour basis, for example. Each utilization value per unit time of the plurality of time units can be plotted as a visual aid to a user or can be analyzed automatically by the system.

In the example shown in FIG. 3B, the VMs 312 A, B, E, and F are reconfigured to the server 304 to reduce net resource utilization. That is, the corresponding utilization patterns 344, 348, 352, 356 have peaks and valleys of utilization as a function of time that bring the combined (or net) utilization value of the VMs operating on their corresponding server to an acceptable level for the level throughout the time window. In other words, the resource utilization versus time of the various VMs on a server should "destructively interfere" (have peaks and valleys of utilization that, when summed for each unit of time, reduce the total utilization of the server by the VMs). The result of reconfiguring VMs 312 A, B, E, and F to the server 304 based on their "destructively interfering" utilization patterns decreases the net resource utilization demands placed on the server by the assigned VMs throughout the time window.

Examples of a time window can include an hour, a day, a month, or other period that includes a plurality of utilization measurements per unit time. Because VM utilization patterns as a function of time are analyzed and used to determine VM reconfigurations, future over-utilizations (particularly those associated with a repeating pattern of utilization) are avoided. This is in contrast to conventional methods using an average utilization which may reduce some over-utilizations but fail to correct (or even detect) others.

Reconfiguration System

Figure 4:
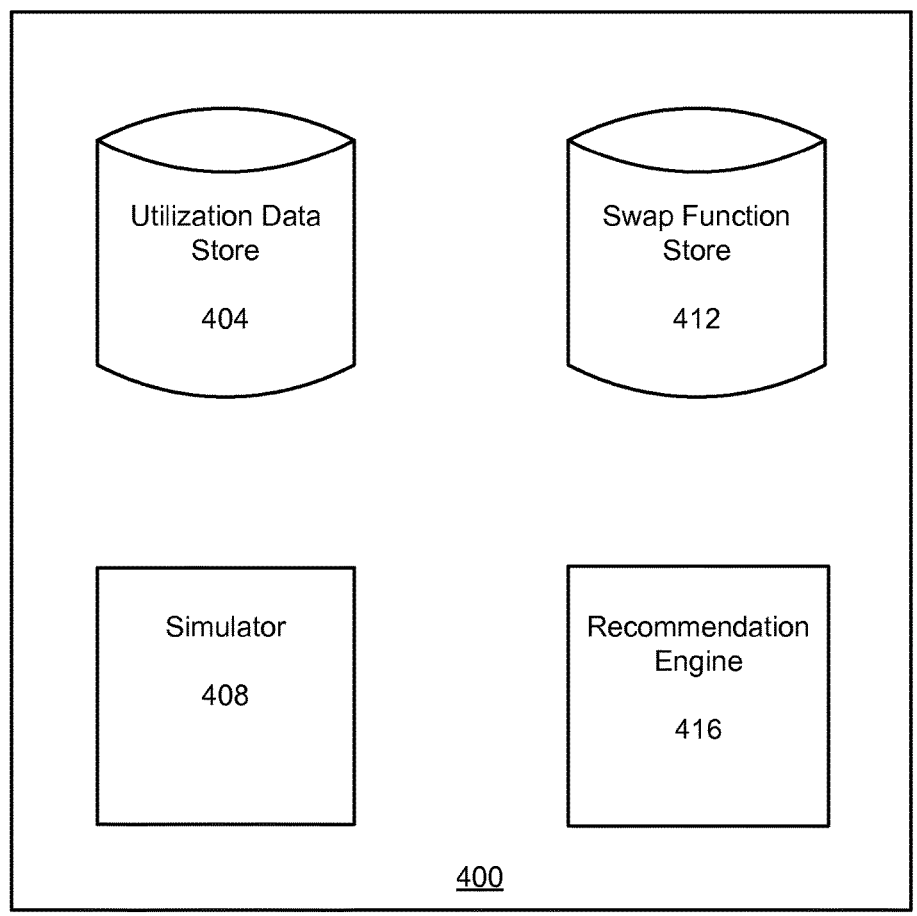
FIG. 4 is a system diagram of a system for reconfiguring virtual machines to reduce network resource utilization, in an embodiment.

FIG. 4 illustrates a system 400 for characterizing CPU and memory resource utilization (among other possible resources) within a VM environment, identifying alternative configurations for reducing server resource utilization within the server cluster, and reconfiguring the various VMs on the servers of the server cluster. By simulating alternative configurations of VMs on the various servers within the cluster, it is possible to distribute the resource demands such that server CPU utilization and server memory utilization can be lowered for at least some of the servers in the cluster. The effect of this is that the probability and/or frequency of "busy signals" (i.e., times during which tasks or computations are delayed because CPU or memory resources are fully occupied) is reduced compared to a preceding configuration.

The system 400 includes a utilization data store 404, a simulator 408, a swap function store 412, and a recommendation engine 416.

The utilization data store 404 receives and stores utilization (and/or performance) data collected by the network monitors as a function of time, as described above. The utilization data, used to evaluate the CPU and/or memory utilization for the various servers and their corresponding VMs, includes CPU and memory utilization as a function of time. For example FLOPs per second of the various CPUs of the servers 104 is one example of utilization data. Utilization data is used to calculate different utilization metrics and/or produce utilization patterns for each VM assigned to a corresponding server. One such utilization metric is "peak" utilization, which is the highest combined utilization (e.g. CPU utilization or memory utilization) for all VMs in a simulated reconfiguration of servers or in a physical server observed over all time points for a given time window. Another utilization metric is "prime" utilization, which is one standard deviation above the mean calculated from the distribution of utilizations per unit time of a particular metric over the time window. These quantities reflect the time-dependent nature of resource utilization by a server so that fluctuations in aggregate VM resource utilization (that is, a sum of a particular resource metric across all VMs hosted by a particular server per unit time) are incorporated in a metric used to quantify or characterize both the static and dynamic components of utilization. In some embodiments, the CPU peak metric, the CPU prime metric, the memory Peak metric and the memory Prime metric are used to calculate a combined utilization metric indicative of the dynamic overall utilization of resources for a given server. In this context, static components of utilization refer to resource utilization that is near constant and well characterized by a single average metric value; the dynamic components of utilization are resource utilizations that fluctuate and/or vary (whether cyclically or otherwise) that are additive or subtractive to the static "average" utilization. This combined utilization metric, termed a "configuration score" is described in more detail in the context of FIG. 5. Analogous individual and combined utilization metrics can be determined for other network resources, including but not limited to storage devices and network data transmission rates, that are associated with the server cluster.

The simulator 408 executes simulations of one or more alternative configurations of VMs on the servers of the server cluster in order to identify candidate configurations that decrease resource utilization of one or more servers. While described below in more detail, the simulations executed by the simulator 408 explore the simulated utilization metrics of various simulated configurations of VMs assigned to various servers of the server cluster. The simulated configurations are performed using one or more of several "swap" functions. For example, the simulator 408 could simulate grouping VMs with lower resource demands (as defined by the configuration score) on a single server while assigning VMs with higher resource demands individually to their own respective servers. The simulator 408 can run periodically and thus provide a nearly continuous assessment of alternative VM/server configurations, thus providing an administrator with options that are nearly contemporaneous with current resource demands. The periodicity of simulations is, in some examples, set by a user based on the desired number of simulations or the simulation duration.

The swap function store 412 stores one or more protocols or algorithms by which reconfigurations of VMs on different servers of the server cluster are simulated and/or determined. Once the utilization of a reconfiguration is simulated, the reconfiguration can be implemented or discarded. This reconfiguration includes movements (or "swaps") of VMs from one server to a different server from 0 (for non-reconfiguration) to N swaps where N is the total amount of VMs in the cluster. This number of configurations can be limited by the user to reduce the number of swaps (which reduces the resources needed to execute the swap) The functions stored in the swap function store 412 include, but are not limited to a "random" swap, an "N to N" swap, a "chunk" swap, a "friend" swap, and a "problem reduction" swap, each of which is described below.

The swap protocols stored in the swap function store 412 of the system 400 operate similar to a Monte Carlo simulation in determining reconfigurations, but with some important distinctions. In a conventional Monte Carlo simulation, a single VM would be selected at random and then a single server would be selected at random. In a utilization simulation, the selected VM would be re-assigned from its original server to a new server and the resource utilization of the reconfiguration simulated for comparison to the original configuration. By repeating this process, a large number of VM/server combinations will be tested with some of the combinations showing an improvement in performance (i.e., a reduction in resource utilization) over the original configuration. However, the time needed to identify an improved configuration using a conventional Monte Carlo simulation can be impracticably or inconveniently long.

To expedite execution of the swap protocols compared to a conventional Monte Carlo simulation, the various swap protocols stored in the swap function store 412 each implement different variations on a conventional Monte Carlo simulation. A "random" swap function will randomly choose and execute a number of reconfigurations of VMs on servers. For example, if the random swap function is engaged, and the random number of swaps is randomly chosen as 3, then three randomly selected VMs in the system environment would be selected and reassigned to three randomly selected servers. The resulting utilization of the reconfigured VMs on the servers would then be simulated and compared to the original configuration. If the utilization is not reduced by the reconfiguration, another random swap configuration will be identified and the performance simulated until a performance improvement over the original configuration is identified.

Another example of a swap protocol, the "N to N swap," is also stored in the swap function store 412 of the system 400. Using this function, if N is selected as equal to one, for example, a first, single randomly selected VM is moved from a first server to a single randomly selected second server and, from that second server, a second randomly chosen VM is moved to the first server. For N=1, two VM's are moved in total but the number of VMs on each server is unchanged. This is the case regardless of the value of N.

Still another example swap function stored in the swap function store 412 of the system 400 is the "chunk swap" protocol. The chunk swap is similar to the N to N swap except that the chuck swap seeks to select one or more VMs for reconfiguration that are approximately the same in resource consumption (aggregated for all times within a time window). For example, if a single, high-resource (on average) consuming VM is reconfigured from an originating server to a target server, then the chunk swap function will seek to swap one or more VMs from the target server having an aggregate consumption similar to the VM from the originating server. In other words, the quantity or percentage of resources (aggregated for all times) consumed is used to determine the number of VMs that are swapped. Then having established congruity of the swapped chunks, the swap can be analyzed, as is done in any swap, to see if the configuration score, which is based on the individual aggregated resource utilizations per unit time and described below in more detail, reduces utilization.

Still another example swap protocol stored in the swap function store 412 of the system 400 is the "friend swap" protocol. In this protocol, VMs are identified as "friends" if the time series data of CPU utilization and memory utilization (weighted based on user preference for relative CPU and Memory efficiency) corresponding to the VMs are the most anti-correlated compared to all other VM-VM pairs. That is, the VMs are identified as "friends" if the utilization patterns of the VMs "destructively interfere" as a function of time. That is, as described above, as the resource utilization of a first VM on a server increases, the utilization of a second VM on a server declines. Once "friendly" VMs are identified, the friend swap function moves the first VM from its origin server to a target server where the second, friendly, VM "friend" is situated.

The friend swap, as all of the above swap functions, may be temporary in some cases because, even though the two VMs moved together are anti-correlated, this does not necessarily mean that the aggregate of the two VM's will be ultimately anti-correlated with the remaining VM's on the target server. This condition should be at least partially met for an improvement in configuration score and server performance.

In other examples, the friendly VMs (having been moved together with a successful friend swap or having come together by chance through a different swap) can be protected and locked as a pair such that they will no longer be moved in further swaps.

Still another example swap protocol stored in the swap function store 412 of the system 200 is a "problem reduction swap" protocol which can be thought of as the complementary function to friend swap. Where the friend swap identified VM pairs that were anti-correlated this protocol identifies VMs that are correlated with each other (i.e., the resource utilization pattern of a first VM has a similar trend in time to a second VM). This correlation of VM resource utilization poses a risk to server performance because correlation will consume more server resources at the same times, thus pushing utilization towards a maximum server capacity. The role of the problem reduction swap function is to split up correlated VM pairs to different servers.

Each swap protocol is, in some examples used singly, solely, and repeatedly. In other examples, swap protocols are each applied periodically. Cycling through the various swap protocols enables a balance of finding a low configuration score in a shorter amount of iterations because each of the protocols addresses a different type of utilization constraint. Alternatively, various swaps can be applied or not applied intentionally to reduce specific problems.

In some embodiments, different swap protocols are applied more frequently in an attempt to achieve a recommendation of a final configuration faster. In one embodiment the iterations will choose the swap functions in the following order: random swap with a random number of swaps, N to N swap where N=1, N to N swap where N=2, problem reduction swap, chunk swap with a random chunk size, N to N swap where N is a random number which is less than the number of allowed moves remaining, friend swap. The next swap function following the final friend swap would restart the process with the random swap.

The recommendation engine 416 receives the output of the various configurations simulated by the simulator 408, compares it with the resource utilization of the current configuration stored in the utilization data store 404 and provides to a user one or more alternative configurations that reduce resource utilization on average for the overall cluster.

Calculation of Cluster Metrics for Different Configurations

Figure 5:
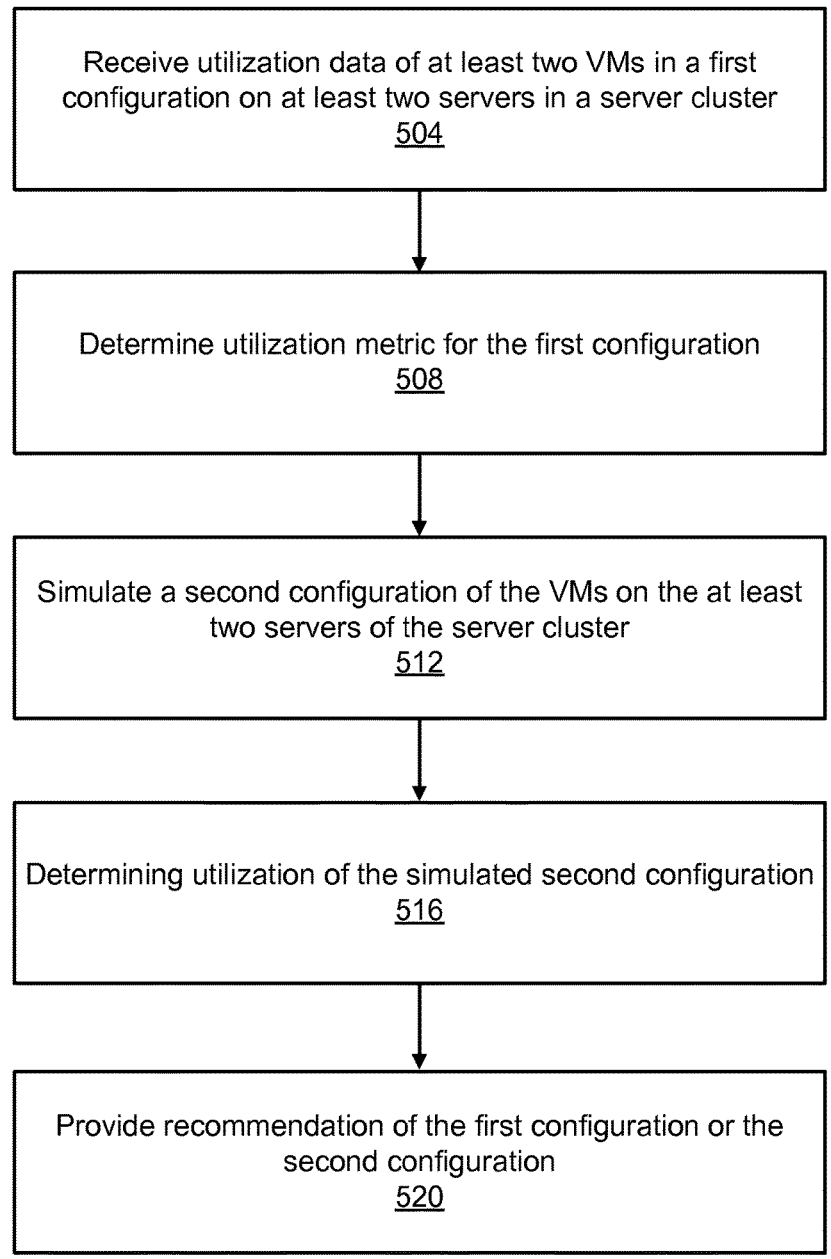
FIG. 5 is an example method flow diagram for reducing resource utilization across a server cluster hosting a plurality of virtual machines, in an embodiment.

Because reducing the maximum resource utilization at a given point in time for a given server reduces the probability of exceeding the upper operational capacity of the resource (according to the Erlang C formula), the system 400 is applied to identify alternative configurations of the various VMs on the various servers in order to reduce, for example, CPU and/or memory utilization. FIG. 5 illustrates one example method 500 for applying the methods and systems described herein.

The method 500 begins with the collection 504 of utilization data of the servers (and/or storage devices) of the server cluster in a first configuration of VMs. As mentioned above, this utilization data is collected by network monitors in communication with the network and/or network components as a function of time within a measurement time window. The utilization data includes, but is not limited to, FLOPS/second (or unit time), megabits/second (or unit time), or other appropriate indication of utilization.

A baseline utilization of a first configuration of VMs on servers is determined 508. In one embodiment, this baseline is determined 508 by calculating the previously mentioned configuration score (based on utilization patterns per unit time within a measurement time window) for the VM's as they are currently arranged among the servers in the cluster of interest. Using the peak and prime utilization values incorporates a quantitative measurement of a corresponding utilization pattern even though the utilization pattern itself is not directly used in an analysis. This determined utilization metric then acts as a baseline for comparison used later in the method to determine whether a simulated alternative configuration will improve the performance of the server cluster by reducing resource utilization. All future proposed configurations will be compared against this original configuration and its corresponding configuration score.

In one embodiment, the utilization metric is a configuration score that is a product, sum, or combination thereof, of various utilization metrics. In one example, the configuration score is equal to: CPU Peak average for all servers of the cluster+(CPU Prime average for all servers of the cluster*a prime weight factor)+(memory weight*(memory peak average for all servers+memory prime average for all servers*prime weight)). In one embodiment the memory weight and CPU weight exist as user settings.

Having determined 508 baseline utilization of the current configuration, a second (and/or alternative) configuration of the VMs on the servers of the server cluster is determined and its utilization calculated 516 using the methods described above. The utilization of the second (and/or alternative) configuration is then compared to the first configuration using the same utilization metrics that characterize the first configuration (whether summarized by a configuration score or by some other utilization indication).

Upon comparing the first and the second configuration, a configuration is recommended 520. If the second configuration has an increased resource utilization compared to the first configuration, then the first configuration will be recommended. However, if the second configuration shows a decrease in utilization compared to the first configuration, it will be recommended.

In one embodiment, a recommendation identifies a set of VMs, the servers on which the VMs are currently running, and one or more recommended servers for which the VM should be moved to. For example, the recommendation is presented as the following table.

| VM Name | Original Server | Recommended Server |
|---|---|---|
| VM-APP1 | SERVER4 | SERVER2 |
| VM-MAIL1 | SERVER4 | SERVER2 |
| VM-BACKUP2 | SERVER4 | SERVER5 |
| VM-SQL3 | SERVER5 | SERVER4 |

Optionally, the utilization changes may also be presented, as is illustrated below.

| CPU | PEAK | −4.6% |
|---|---|---|
| MEMORY | PEAK | −3.1% |
| DISK | PEAK | +3.8% |
| NETWORK | PEAK | +5.9% |
| CPU | PRIME | −2.2% |
| MEMORY | PRIME | −4.3% |
| DISK | PRIME | +1% |
| NETWORK | PRIME | +7.2% |

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer implemented method comprising:
receiving virtual machine utilization data per unit time in a time window for at least two virtual machines, the at least two virtual machines in a first configuration on at least two servers in a server cluster;
determining a CPU utilization metric and a memory utilization metric for each of the at least two virtual machines in the first configuration, wherein the CPU utilization metric comprises a prime utilization of CPU utilization, wherein the prime utilization comprises a mean utilization per unit time within the time window plus one standard deviation of utilization for each corresponding unit time;
simulating a second configuration of the at least two virtual machines on the at least two servers in the server cluster, wherein the second configuration comprises a movement of not more than a predetermined number of the at least two virtual machines between the at least two servers in the cluster;
determining a CPU utilization metric and a memory utilization metric for the at least two virtual machines corresponding to the simulated second configuration, wherein the memory utilization metric comprises a prime utilization of memory utilization;
determining, by a processing device, a first net utilization metric based on a first combination of the CPU utilization metric and the memory utilization metric for each of the at least two servers of the first configuration and determining a second net utilization metric based on a second combination of the CPU utilization metric and the memory utilization metric for each of the at least two servers of the simulated second configuration, wherein configurable weighting values are applied to the CPU utilization metric and the memory utilization metric in the first and second combinations to determine the first and second net utilization metrics;
comparing the first net utilization metric to the second net utilization metric; and
responsive to the second net utilization metric having a lower value that the first net utilization metric, reconfiguring the at least two virtual machines on the at least two servers according to the second configuration.

2. The method of claim 1, wherein the CPU utilization metric further comprises a peak utilization of at least one of CPU utilization and the memory utilization metric comprises a peak utilization of memory utilization, wherein the peak utilization comprises a highest combined utilization for the at least two virtual machines in the time window.

3. The method of claim 1, further comprising providing a recommendation of one of the first configuration and the second configuration.

4. The method of claim 1, wherein the second configuration is determined by executing at least one swap function.

5. The method of claim 4, wherein the at least one swap function comprises an N to N swap moving a number N of the at least two virtual machines from a first randomly selected server to a second randomly selected server and moving the number N of the at least two virtual machines from the second randomly selected server to the first randomly selected server.

6. The method of claim 4, wherein the at least one swap function comprises a problem reduction swap for separating a first virtual machine on a first server from a correlated second virtual machine on the first server.

7. The method of claim 4, wherein the at least one swap function comprises a chunk swap for exchanging at least one of the two or more virtual machines from a first server to a second server and at least one of the two or more virtual machines from the second server to the first server, the exchanged virtual machines of the first server and the second server having approximately the same resource utilization.

8. The method of claim 4, wherein the at least one swap function comprises a friend swap for moving a first virtual machine having a first resource utilization pattern from a first server to a second server, the second server having a second virtual machine with a second resource utilization pattern that destructively interferes with the first utilization pattern of the first virtual machine.

9. A non-transitory computer-readable storage medium that includes instructions that, when loaded into memory, cause a processor to:
receive virtual machine utilization data per unit time in a time window for at least two virtual machines, the at least two virtual machines in a first configuration on at least two servers in a server cluster;
determine a CPU utilization metric and a memory utilization metric for each of the at least two virtual machines in the first configuration, wherein the CPU utilization metric comprises a prime utilization of CPU utilization, wherein the prime utilization comprises a mean utilization per unit time within the time window plus one standard deviation of utilization for each corresponding unit time;
simulate a second configuration of the at least two virtual machines on the at least two servers in the server cluster, wherein the second configuration comprises a movement of not more than a predetermined number of the at least two virtual machines between the at least two servers in the cluster;
determine a CPU utilization metric and a memory utilization metric for the at least two virtual machines corresponding to the simulated second configuration, wherein the memory utilization metric comprises a prime utilization of memory utilization;
determine a first net utilization metric based on a first combination of the CPU utilization metric and the memory utilization metric for each of the at least two servers of the first configuration and determining a second net utilization metric based on a second combination of the CPU utilization metric and the memory utilization metric for each of the at least two servers of the simulated second configuration, wherein configurable weighting values are applied to the CPU utilization metric and the memory utilization metric in the first and second combinations to determine the first and second net utilization metrics;
compare the first net utilization metric to the second net utilization metric; and
responsive to the second net utilization metric having a lower value that the first net utilization metric, reconfigure the at least two virtual machines on the at least two servers according to the second configuration.

10. The non-transitory computer-readable storage medium of claim 9, wherein the CPU utilization metric further comprises a peak utilization of at least one of CPU utilization and the memory utilization metric comprises a peak utilization of memory utilization, wherein the peak utilization comprises a highest combined utilization for the at least two virtual machines in the time window.

11. The non-transitory computer-readable storage medium of claim 9, wherein the instructions further cause the processor to provide a recommendation of one of the first configuration and the second configuration.

12. The non-transitory computer-readable storage medium of claim 9, wherein the second configuration is determined by executing at least one swap function.

13. The non-transitory computer-readable storage medium of claim 12, wherein the at least one swap function comprises an N to N swap moving a number N of the at least two virtual machines from a first randomly selected server to a second randomly selected server and moving the number N of the at least two virtual machines from the second randomly selected server to the first randomly selected server.

14. The non-transitory computer-readable storage medium of claim 12, wherein the at least one swap function comprises a problem reduction swap for separating a first virtual machine on a first server from a correlated second virtual machine on the first server.

15. The non-transitory computer-readable storage medium of claim 12, wherein the at least one swap function comprises a chunk swap for exchanging at least one of the two or more virtual machines from a first server to a second server and at least one of the two or more virtual machines from the second server to the first server, the exchanged virtual machines of the first server and the second server having approximately the same resource utilization.

16. The non-transitory computer-readable storage medium of claim 12, wherein the at least one swap function comprises a friend swap for moving a first virtual machine having a first resource utilization pattern from a first server to a second server, the second server having a second virtual machine with a second resource utilization pattern that destructively interferes with the first utilization pattern of the first virtual machine.

* * * * *